United States Patent
Wang (10) Patent No.: US 9,218,508 B2
(45) Date of Patent: Dec. 22, 2015

(54) ELECTRONIC DEVICE AND PROTECTION METHOD THEREOF

(71) Applicant: GETAC TECHNOLOGY CORPORATION, Hsinchu County (TW)

(72) Inventor: Hsien-Yu Wang, Taipei (TW)

(73) Assignee: Getac Technology Corporation, Hsinchu County (TW)

( * ) Notice: Subject to any disclaimer, the term of this patent is extended or adjusted under 35 U.S.C. 154(b) by 106 days.

(21) Appl. No.: 14/020,650

(22) Filed: Sep. 6, 2013

(65) Prior Publication Data

US 2015/0074834 A1    Mar. 12, 2015

(51) Int. Cl.
G06F 21/78 (2013.01)
G06F 21/81 (2013.01)
G06F 21/31 (2013.01)
G06F 21/88 (2013.01)

(52) U.S. Cl.
CPC ............. G06F 21/78 (2013.01); G06F 21/316 (2013.01); G06F 21/81 (2013.01); G06F 21/88 (2013.01); G06F 2221/2111 (2013.01)

(58) Field of Classification Search
CPC ..... G06F 21/31; G06F 21/60; G06F 21/6254; G06F 21/74; G06F 21/88; G06F 2221/2111; H04W 4/021; H04W 4/023; H04W 12/08
See application file for complete search history.

(56) References Cited

U.S. PATENT DOCUMENTS

| | | | | |
|---|---|---|---|---|
| 5,892,906 A * | 4/1999 | Chou et al. | | 726/19 |
| 7,590,837 B2 * | 9/2009 | Bhansali et al. | | 713/2 |
| 7,650,647 B1 * | 1/2010 | Hansmann et al. | | 726/34 |
| 8,302,152 B1 * | 10/2012 | Hewinson | | 726/1 |
| 8,396,452 B1 * | 3/2013 | Matsuoka | | 455/410 |
| 8,572,410 B1 * | 10/2013 | Tkacik et al. | | 713/193 |
| 8,595,810 B1 * | 11/2013 | Ben Ayed | | 726/8 |
| 8,644,696 B2 * | 2/2014 | Chan | | 396/86 |
| 2004/0073787 A1 * | 4/2004 | Ban et al. | | 713/159 |
| 2005/0223220 A1 * | 10/2005 | Campbell et al. | | 713/164 |
| 2008/0092145 A1 * | 4/2008 | Sun et al. | | 719/312 |
| 2008/0140967 A1 * | 6/2008 | Breslau et al. | | 711/163 |
| 2008/0209206 A1 * | 8/2008 | Vaha-Sipila et al. | | 713/155 |
| 2009/0249053 A1 * | 10/2009 | Zimmer et al. | | 713/2 |

(Continued)

FOREIGN PATENT DOCUMENTS

WO     WO 02095581 A2 * 11/2002

OTHER PUBLICATIONS

"ARM Security Technology—Building a Secure System using TrustZone Technology", 2009, PRD29-GENC-009492C, 108 pages.*

*Primary Examiner* — Andrew Nalven
*Assistant Examiner* — Walter Malinowski (57) ABSTRACT

An electronic device includes a positioning module, a micro processing unit and a first storing device. The micro processing unit electrically connects with the positioning module and the first storing device. The electronic detects a position thereof via the positioning module and generates a positioning coordinate datum. The micro processing unit determines whether the electronic device is in a preset working area through the positioning coordinate datum. When the electronic device is not in the preset working area, the micro processing unit stops the electronic device from accessing the first storing device. When the electronic device is in the preset working area, the micro-processing unit allows the electronic device to access the first storing device and boot a first operating system stored thereon.

16 Claims, 9 Drawing Sheets

(56) References Cited

U.S. PATENT DOCUMENTS

| | | | |
|---|---|---|---|
| 2010/0031349 A1* | 2/2010 | Bingham | 726/20 |
| 2010/0225953 A1* | 9/2010 | Engst et al. | 358/1.15 |
| 2011/0099359 A1* | 4/2011 | O'Neil | 713/2 |
| 2011/0154008 A1* | 6/2011 | Weng et al. | 713/2 |
| 2011/0264899 A1* | 10/2011 | Evans et al. | 713/1 |
| 2012/0030752 A1* | 2/2012 | Bruno et al. | 726/16 |
| 2012/0075098 A1* | 3/2012 | Kuncl | 340/539.32 |
| 2012/0166746 A1* | 6/2012 | Amar et al. | 711/163 |
| 2012/0290825 A1* | 11/2012 | You | 713/2 |
| 2012/0297177 A1* | 11/2012 | Ghosh et al. | 713/2 |
| 2012/0311285 A1* | 12/2012 | Smith | 711/163 |
| 2013/0046544 A1* | 2/2013 | Kay et al. | 704/275 |
| 2013/0072233 A1* | 3/2013 | Sandholm | 455/456.3 |
| 2013/0176436 A1* | 7/2013 | Lin et al. | 348/148 |
| 2013/0227651 A1* | 8/2013 | Schultz et al. | 726/4 |
| 2013/0238784 A1* | 9/2013 | Teller et al. | 709/224 |
| 2013/0251215 A1* | 9/2013 | Coons | 382/118 |
| 2013/0310003 A1* | 11/2013 | Sadhvani et al. | 455/411 |
| 2014/0007120 A1* | 1/2014 | Spitz | 718/102 |
| 2014/0007226 A1* | 1/2014 | Inoue | 726/19 |
| 2014/0055244 A1* | 2/2014 | Burchell et al. | 340/10.1 |
| 2014/0123273 A1* | 5/2014 | Matus | 726/17 |
| 2014/0195927 A1* | 7/2014 | DeWeese et al. | 715/750 |
| 2014/0235203 A1* | 8/2014 | Gonsalves | H04L 63/0823 455/410 |
| 2014/0237378 A1* | 8/2014 | Gonen et al. | 715/745 |
| 2014/0364085 A1* | 12/2014 | Garcia | 455/411 |
| 2014/0365315 A1* | 12/2014 | Laadan et al. | 705/14.66 |
| 2014/0367971 A1* | 12/2014 | Tanavde et al. | 290/52 |
| 2015/0028996 A1* | 1/2015 | Agrafioti et al. | 340/5.82 |
| 2015/0074834 A1* | 3/2015 | Wang | 726/36 |

\* cited by examiner

ELECTRONIC DEVICE AND PROTECTION METHOD THEREOF

BACKGROUND OF THE INVENTION

1. Field of the Invention

The present invention relates to an electronic device, more particularly to an electronic device that can protect information therein. The present invention also relates to a protection method.

2. Description of the Related Art

With the rapid development of science and technology, electronic devices are more popular in recent years. As a matter of fact, electronic devices, such as personal computers, tablet PCs, smart phones, etc., have become necessary tools in daily life.

Generally speaking, the electronic device is usually provided with an internal storage device, such as a memory or a hard disk, so that user can directly record data in the electronic device, in order to manage and use the data. Since the information recorded in the electronic device, such as the information of a company, factory or a user's private information could be much more valuable than the electronic device itself, when the user loses the electronic device, or the electronic device is stolen, the company or the user could be greatly damaged.

The current electronic devices on the market usually use passwords to protect the information therein. For example, a correct password must be input when a computer is in the boot stage, and then the computer can enter into the operation system. For another example, user can setup a password for important data, and therefore the data will be allowed to be opened, copied, moved, and deleted after inputting the correct password. However, the password that protects information can be easily cracked, that is, such protection is not good enough.

Further, for important data, which can be hidden by the user, so as to let a third party difficult to find out the data. However, an electronic device will simultaneously drive a storing device thereof while in the boot stage. Thus, even the data is hidden, once the data is stored in the same storing device, it is still possible to be stolen.

SUMMARY OF THE INVENTION

The main objective of the present invention is to provide an electronic device and a protection method thereof. The present invention is able to position the electronic device and restrict that the electronic device only accesses a specific storing device thereof in a specific area, so as to protect the information in the storing device. That is, the information stored in the electronic device is not accessed randomly.

To approach the above objective, the present invention provides a positioning module, a micro processing unit and an electronic device with a first storing device. The micro processing unit electrically connects with the positioning module and the first storing device. The electronic device is used to detect a position thereof via the positioning module and generate a positioning coordinate datum. The micro processing unit determines whether the electronic device is in a preset working area through the positioning coordinate datum. When the electronic device leaves the preset working area, the micro processing unit stops the electronic device accessing the first storing device.

Compared to related arts, the present invention is capable of restricting that the electronic device accesses a specific storing device thereof only when the electronic device is in the preset working area. Hence, only when a user is in the preset working area that he can operate the electronic device, and the information in the specific storing device can then be accessed. Otherwise, when the user brings the electronic device out of the preset working area, or the electronic device is stolen to be out of the preset working area, the electronic device may not properly access the specific storing device. Through the present invention, the user can store important information stored in the specific storing device, so as to protect the information stored in the specific storing device by means of positioning the electronic device.

BRIEF DESCRIPTION OF THE DRAWINGS

The objects, spirits, and advantages of the preferred embodiments of the present invention will be readily understood by the accompanying drawings and detailed descriptions.

DETAILED DESCRIPTION OF THE INVENTION

Following preferred embodiments and figures will be described in detail so as to achieve aforesaid objects.

Figure 1:
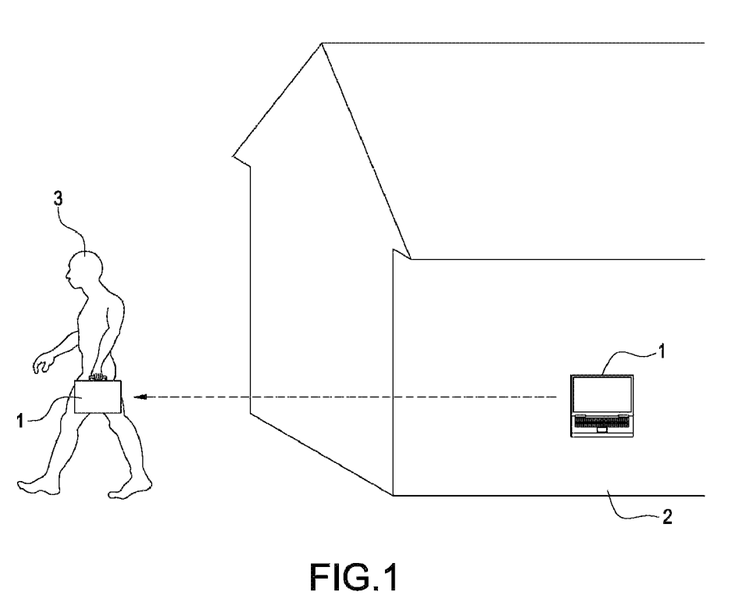
FIG. 1 illustrates a schematic application view of a first embodiment of the present invention.
Figure 2:
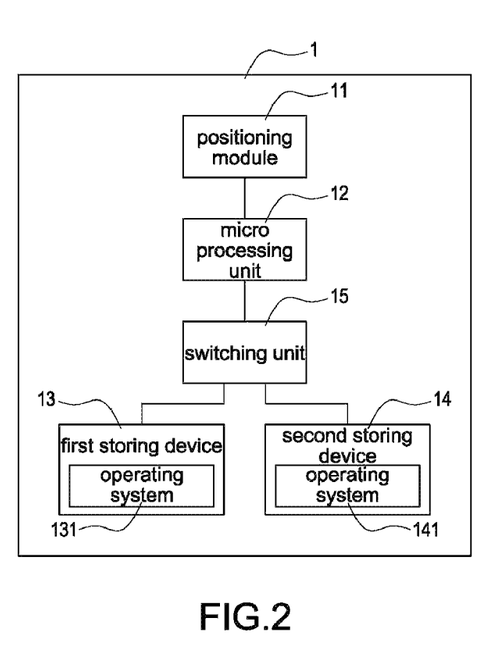
FIG. 2 illustrates a schematic block view of the electronic device of a first embodiment of the present invention.

Please refer to FIG. 1, which illustrates a schematic application view of a first embodiment of the present invention. The present invention sets a storing device of the electronic device 1 (a first storing device 13 as shown in FIG. 2) to correspond to a preset working area 2, such as an office, a company, a factory, a house, or other specific places. Through the present invention, the electronic device 1 is allowed to access the first storing device 13 only when the electronic device 1 is operated in the preset working area 2. Otherwise, when a user 3 takes the electronic device 1 out of the preset working area 2 or the electronic device 1 is stolen by a third party from the preset working area 2, the electronic device 1 cannot properly access the first storing device 13 even the electronic device 1 is turned on.

As aforesaid, the user 3 is able to store the related information of a company, a factory, or the personal information of the user 3 into the first storing device 13. Therefore, only when the electronic device 1 is operated in the preset working area 2, the information stored in the first storing device 13 can be correctly accessed by the electronic device 1 in order to protect such data from being accessed by the third party.

There is one thing to be noted. For an embodiment, the electronic device 1 is able to install data into a plurality of storing devices (the first storing device 13 and a second storing device 14 as shown in FIG. 2). The current embodiment mainly takes two storing devices as an example, but the number of the storing devices of the present invention is not limited, and should be decided according to practical conditions. The first storing device 13 and the second storing device 14 respectively store one operating system needed by the electronic device 1. The user 3 is able to setup the electronic device 1 in order to make one of the storing devices 13 and 14 (for example, the first storing device 13) correspond to the preset working area 2. Hence, when the electronic device 1 is activated in the preset working area 2, the electronic device 1 may boot via the first storing device 13 and is permitted to access the first storing device 13. When the electronic device 1 is activated outside of the preset working area 2, the electronic device 1 may boot via the second storing device 14 and is not permitted to access the first storing device 13. Accordingly, the information of the first storing device 13 may be effectively protected.

Please refer to FIG. 2, which illustrates a schematic block view of the electronic device of the first embodiment of the present invention. The electronic device 1 can be a PC, a laptop, a tablet, a smartphone, a personal digital assistant (PDA), etc., but is not limited thereto. As shown in FIG. 2, the electronic device 1 has a positioning module 11, a micro processing unit 12, the first storing device 13, the second storing device 14, and a switching unit 15. Only one of the first storing device 13 and the second storing device 14 is corresponding to the preset working area 2. In the following examples, the first storing device 13 is configured to correspond to the preset working area 2.

The positioning module 11 detects a current position where the electronic device 1 locates and generates a positioning coordinate datum according to a detection result. The micro processing unit 12 electrically connects with the positioning module 11, and the positioning module 11 receives the positioning coordinate datum. The micro processing unit 12 determines whether the electronic device 1 is in the preset working area 2 according to the positioning coordinate datum. For the current embodiment, the positioning module 11 can be the Global Positioning System (GPS), Compass II Positioning System, Glonass System, or Location-Based Service (LBS), but is not limited thereto.

The first storing device 13 electrically connects with the micro processing unit 12. When the micro processing unit 12 determines that the electronic device 1 is not in the preset working area 2, the electronic device 1 is stopped from accessing the first storing device 13. Otherwise, when the micro processing unit 12 determines that the electronic device 1 is in the preset working area 2, the electronic device 1 is allowed to access the first storing device 13.

The second storing device 14 also electrically connects with the micro processing unit 12. The second storing device 14 of the current embodiment can be used as a backup storing device and is an independent hard disk device separated from the first storing device 13 (not a storing device logically divided into two memory areas). More specifically, the first storing device 13 and the second storing device 14 are two independent hard devices (for example, two separate solid state disks or/and mechanical hard disks). Moreover, the first storing device 13 and the second storing device 14 can be integrally combined with each other to become a hard disk device (for example, a solid state disk and a mechanical disk being integrated to be as a mixed hard disk).

For the current embodiment, when the micro processing unit 12 determines that the electronic device 1 is not in the preset working area 2 and stops the electronic device 1 accessing the first storing device 13, the micro processing unit 12 will simultaneously permit the electronic device 1 to access the second storing device 14. For example, when the start button of the electronic device 1 is triggered, the electronic device 1 will be turned on from a standby state, and activate the positioning module 11 and activate the micro processing unit 12. Then, the electronic device 1 can be positioned by the positioning module 11. When the electronic device 1 is detected in the preset working area 2, the electronic device 1 can access the first storing device 13 in order to perform a boot process via the first storing device 13. Otherwise, when the electronic device 1 is detected not in the preset working area 2, the electronic device 1 is thus stopped from accessing the first storing device 13, and then the electronic device 1 will perform a boot process via the second storing device 14, to protect the data in the first storing device 13 from being accessed.

More specifically, the first storing device 13 and the second storing device 14 may electrically connect with the micro processing unit 12 via the switching unit 15. In the embodiment, the switching unit 15 can be a serial advanced technology attachment integrated circuit (for example, SATA IC) and connects with the first storing device 13 and the second storing device 14 through a signal line (for example, SATA transmission line), but is not limited thereto.

As aforementioned, when the micro processing unit 12 determines that the electronic device 1 is not in the preset working area 2, a control command is sent to the switching unit 15, and the switching unit 15 will accordingly disable the first storing device 13 and enables the second storing device 14. Therefore, the electronic device 1 is only able to access the second storing device 14. Further, when the micro processing unit 12 determines that the electronic device 1 is in the preset working area 2, another control command is sent to the switching unit 15, and the switching unit 15 can then enable the first storing device 13, so that the electronic device 1 is capable of accessing the first storing device 13.

There is one thing to be noted. When the electronic device 1 is in the preset working area 2, the switching unit 15 enables the first storing device 13, and simultaneously disables the second storing device 14. Or, the first storing device 13 can be set as a first priority of all storing devices of the electronic device 1. Therefore, when the electronic device 1 is in the preset working area 2 and the storing devices 13 and 14 are simultaneously enabled, the electronic device 1 controls the first storing device 13 to engage the boot process depending on the priority. However, the aforesaid is only a preferred embodiment of the present invention.

The first storing device 13 and the second storing device 14 has the operating system 131 and the operating system 141 respectively. When the electronic device 1 is in the preset working area 2, the electronic device 1 executes a boot process through the operating system 131 of the first storing device 13. Otherwise, when the electronic device 1 is not in the preset working area 2, the electronic device 1 executes another boot process through the operating system 141 of the second storing device 14. Meanwhile, the first storing device 13 is disabled.

There is one thing to be noted. The first storing device 13 and the second storing device 14 can be solid state disks (SSDs) or traditional hard disks. For example, the first storing device 13 is an on-board solid state disk (on-board SSD) in the electronic device 1. Hence, the first storing device 13 will not be accessed outside of the preset working area 2 and will be difficult to be taken out from the electronic device 1. In other words, the first storing device 13 is tough to be found by a third party. Thus, it is highly secured.

Figure 3:
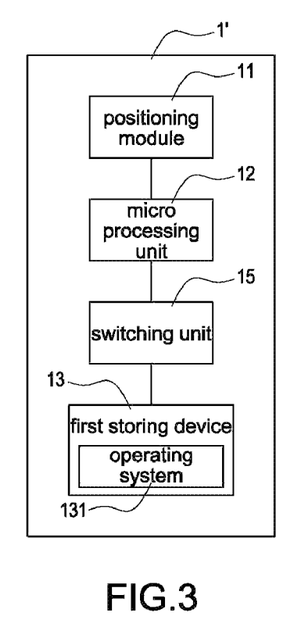
FIG. 3 illustrates a schematic block view of the electronic device of a second embodiment of the present invention.

Please refer to FIG. 3, which illustrates a schematic block view of the electronic device of the second embodiment of the present invention. The difference between the electronic device 1' and the electronic device 1 of the first embodiment is that the electronic device 1' only comprise the first storing device 13, and does not comprise any other storing device, e.g. the second storing device 14.

As aforesaid, when the electronic device 1' is awaken from a standby state, the positioning module 11 can position the electronic device 1' can and generates a positioning coordinate datum according to a detection result. Then, the micro processing unit 12 receives the positioning coordinate datum from the positioning module 11 and determines whether the electronic device 1' is in the preset working area 2 according to the positioning coordinate datum. When the micro processing unit 12 determines that the electronic device 1' is in the preset working area 2, the electronic device 1' is permitted to access the first storing device 13. More specifically, the micro processing unit 12 permits that the electronic device 1' executes the boot process through the operating system 131 of the first storing device 13.

On the contrary, when the micro processing unit 12 judges that the electronic device 1' is not in the preset working area 2 according to the positioning coordinate datum, the electronic device 1' is stopped from accessing the first storing device 13. Since in the second embodiment, the electronic device 1' only has one storing device, so the electronic device 1' cannot enter into an operating system. In other words, the electronic device 1' can be used only when the electronic device 1' is in the preset working area 2. When the electronic device 1' is not in the preset working area 2, the first storing device 13 is not accessed, so that the electronic device 1' cannot be used.

As aforementioned, the first storing device 13 of the electronic device 1' electrically connects with the micro processing unit 12 through the switching unit 15. When the electronic device 1' is not in the preset working area 2, a control command from the micro processing unit 12 is sent to the switching unit 15, and the switching unit 15 disables the first storing device 13. Hence, the electronic device 1' cannot be properly booted. Further, when the micro processing unit 12 determines that the electronic device 1' locates in the preset working area 2, another control command will be sent to the switching unit 15, and the switching unit 15 will enable the first storing device 13. Thus, the electronic device 1' is capable of accessing the first storing device 13.

Figure 4:
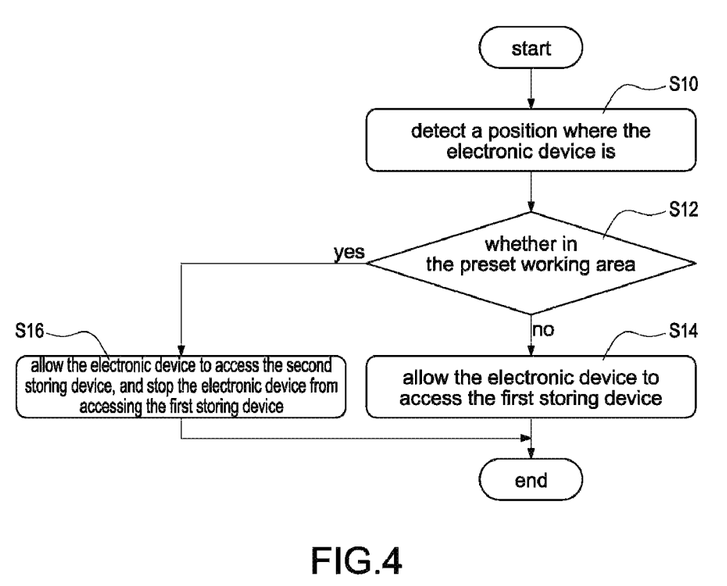
FIG. 4 illustrates a protection flow chart of a first embodiment of the present invention.

Please refer to FIG. 4, which illustrates a protection flow chart of a first embodiment of the present invention. The protection method has the steps of:

S10: detecting a position of the electronic device 1 with the positioning module 11, and acquiring a positioning coordinate datum according to a detection result generated by the positioning module 11;

S12: determining whether the electronic device 1 is in the preset working area 2 via the micro processing unit 12, if the electronic device 1 is not in the preset working area 2, stopping the electronic device 1 from accessing the first storing device 13 corresponding to the preset working area 2;

S14: more specifically, if the micro processing unit 12 judges that the electronic device 1 is in the preset working area 2 in S12, the electronic device 1 being allowed to access the first storing device 13;

S16: if the micro processing unit 12 determines that the electronic device 1 is not in the preset working area 2, allowing the electronic device 1 to access the second storing device 14 and stopping the electronic device 1 from accessing the first storing device 13.

In the present embodiment, the first storing device 13 stores information that is protected by the user 3, and the stored information can only be accessed in the preset working area 2.

Figure 5:
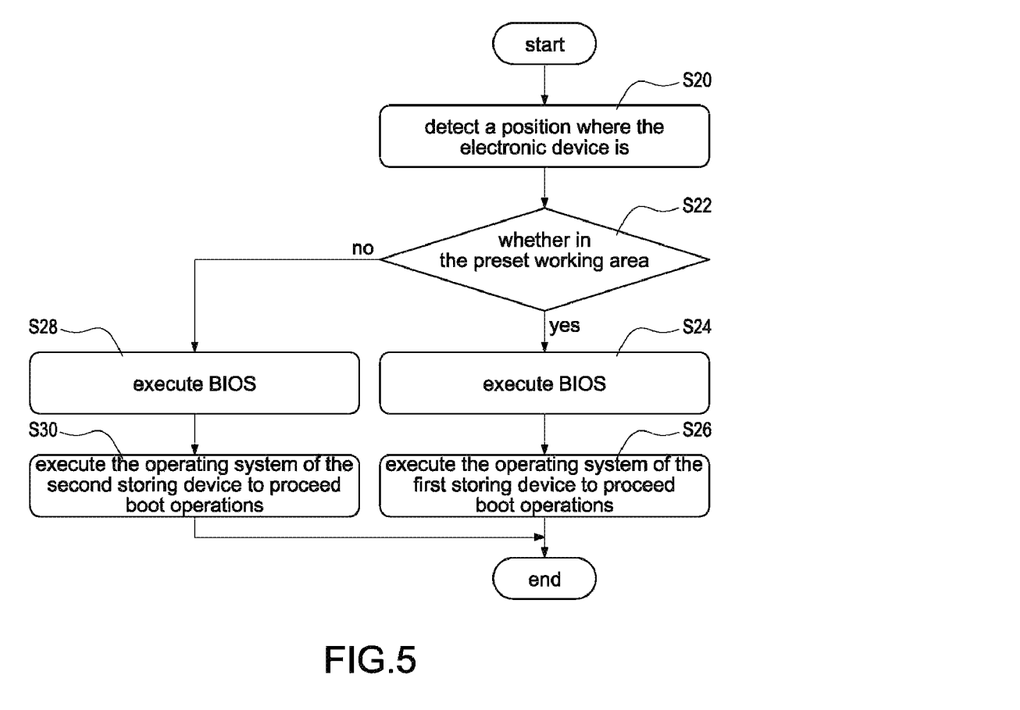
FIG. 5 illustrates a protection flow chart of a second embodiment of the present invention.

Please refer to FIG. 5, which illustrates a protection flow chart of a second embodiment of the present invention. The electronic device 1' is initially in a standby state. When the electronic device 1' is triggered, one of the first storing device 13 and the second storing device 14 in the electronic device 1' is decided to execute the boot process according to a position where the electronic device 1' is. The protection method has the steps of:

(S20) when the electronic device 1' is activated, a position where the electronic device 1' is detected through the positioning module 11;

(S22) determining whether the electronic device 1' is in the preset working area 2 according to a detection result;

(S24) the electronic device 1' executing a basic input/output system (BIOS) therein if the electronic device 1' is in the preset working area 2;

(S26) executing the operating system 131 of the first storing device 13 for the boot process after the basic input/output system is executed;

(S28) if the electronic device 1' is not in the preset working area 2 in (S22), the electronic device 1' executing the basic input/output system; and (S30) executing the operating system 141 of the second storing device 14 in order to execute the boot process by means of the second storing device 14.

There is one thing to be noted. The micro processing unit 12 can first decide one of the first storing device 13 and the second storing device 14 to execute the boot process, and then sends a control command to the switching unit 15. Thus, the switching unit 15 enables a storing device for the boot process, and disables another storing device.

For the embodiment, the switching unit 15 respectively and electrically connects with the first storing device 13 and the second storing device 14 through realistic signal lines (not shown in figure). When the electronic device 1' is not in the preset working area 2, the switching unit 15 may act depending on the control commands from the micro processing unit 12, that is, the signal line of the first storing device 13 is switched to shut down and the signal line of the second storing device 14 is switched to conducting. As a result, the electronic device 1' can only access the second storing device 14, therefore only the second storing device 14 is able to execute the boot process. Further, when the electronic device 1' is in the preset working area 2, the switching unit 15 switches the signal line of the first storing device 13 to conducting according to the control command, and switches the signal line of the second storing device 14 to shut down. Therefore, the electronic device 1' can only execute the boot process through the first storing device 13.

Figure 6:
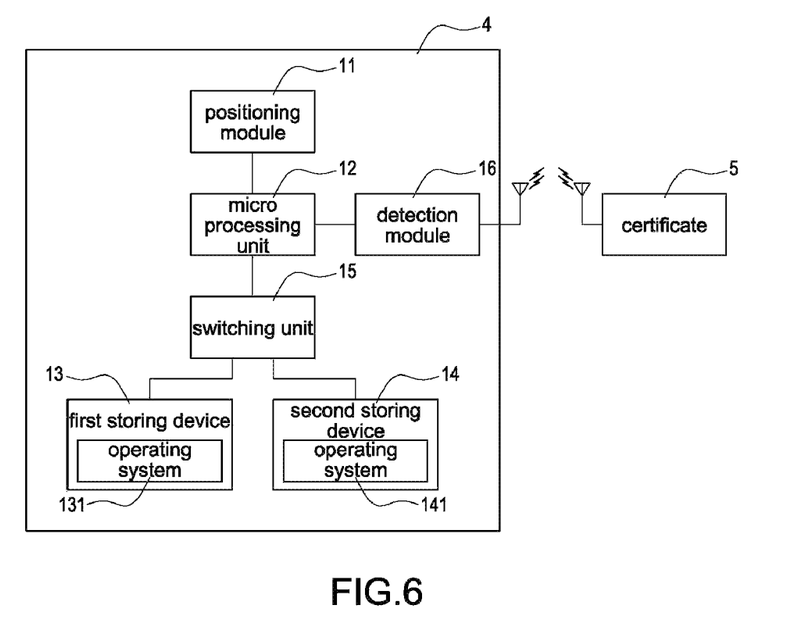
FIG. 6 illustrates a schematic block view of the electronic device of a third embodiment of the present invention.

Please refer to FIG. 6, which illustrates a schematic block view of the electronic device of a third embodiment of the present invention. FIG. 6 comprises an electronic device 4, and the difference between the electronic device 4 and the electronic device 1 is that a detection module 16 is added into the electronic device 4. The detection module 16 electrically connects with the micro processing unit 12, and the electronic device 4 detects an external certificate 5 via the detection module 16. The embodiment mainly uses the certificate 5 to get further protections. For example, the micro processing unit 12 needs to assure that the electronic device 4 is in the preset working area 2 and the certificate 5 is detected and verified, the micro processing unit 12 thus sends a control command to the switching unit 15. The switching unit 15 then enables the first storing device 13.

Figure 7:
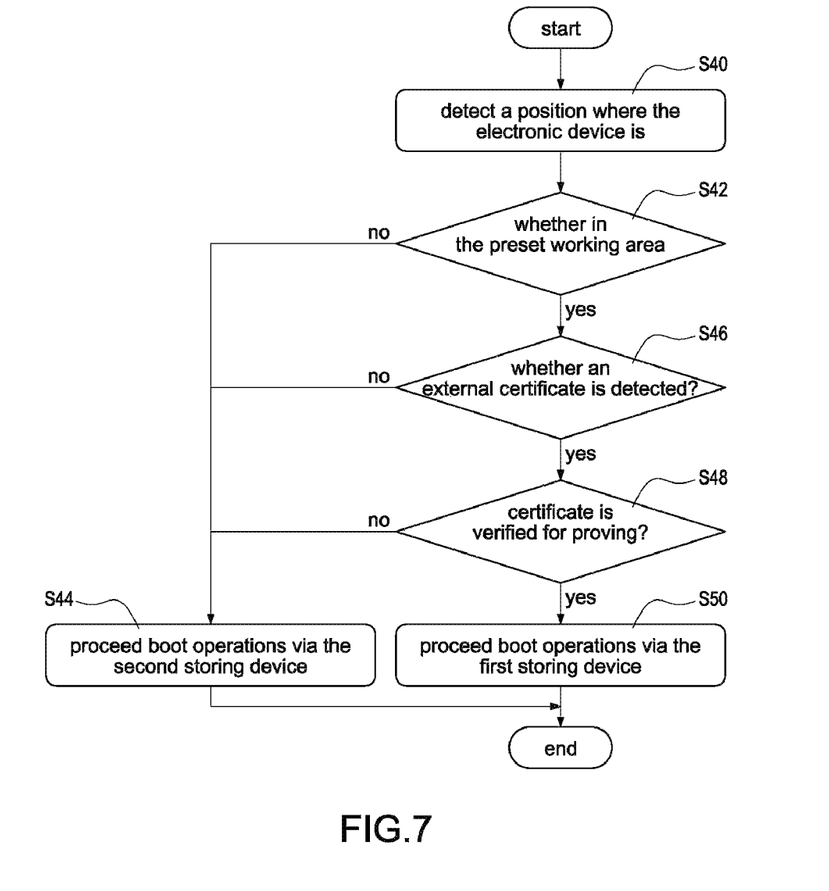
FIG. 7 illustrates a protection flow chart of a third embodiment of the present invention.

Please refer to FIG. 7, which illustrates a protection flow chart of a third embodiment of the present invention. The embodiment adopts the electronic device 4 as an example and has the steps of:

(S40) when the electronic device 4 is triggered in the state of turn-off, a position where the electronic device 4 is being detected via the position module 11;

(S42) the micro processing unit 12 judging whether the electronic device 4 is in the preset working area 2 according to a detection result;

(S44) if the electronic device 4 is not in the preset working area 2, the micro processing unit 12 permitting the electronic device 4 to execute the boot process through the second storing device 14, as shown in FIG. 5, under the conditions, the electronic device 4 not accessing the first storing device 13;

(S46) the micro processing unit 12 judging that the electronic device 4 is in the preset working area 2 in (S42), the micro processing unit 12 further determining whether the external certificate 5 is detected, if no, going to (S44), the electronic device 4 executing the boot process through the second storing device 14;

(S48) if the electronic device 4 detects the certificate 5 through the detection unit 16, the certificate 5 being further verified, if no, the micro processing unit 12 only allowing the electronic device 4 to execute the boot process through the second storing device 14; and (S50) for the embodiment, only when the electronic device 4 is in the preset working area 2, the certificate 5 is detected, and the certificate 5 is verified by the micro processing unit 12, the micro processing unit 12 allowing the electronic device 4 to execute the boot process via the first storing device 13, therefore, the information in the first storing device 13 being effectively protected and being not randomly accessed.

There is one thing to be noted. In FIG. 6, the detection module 16 mainly detects the certificate 5 via a wireless transmission interface. For example, the detection module 16 can be a radio frequency identification module (RFID module) or a near field communication module (NFC module), and the certificate 5 can be an intellectual chip of a radio frequency interface or a near field communication interface, but are not limited thereto.

Figure 8:
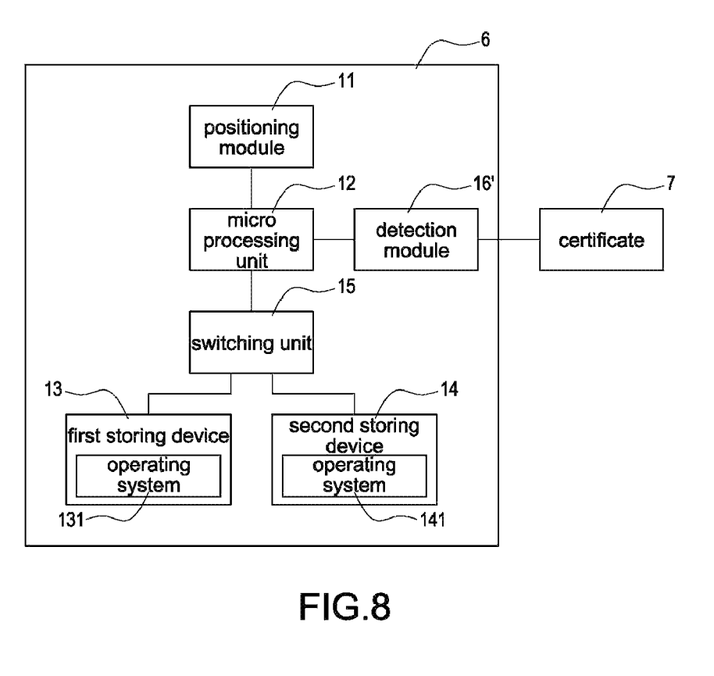
FIG. 8 illustrates a schematic block view of the electronic device of a fourth embodiment of the present invention.

Please refer to FIG. 8, which illustrates a schematic block view of the electronic device of the fourth embodiment of the present invention. The embodiment comprises an electronic device 6, and the difference between the electronic device 6 and the electronic device 4 is that a detection module 16' is added to the electronic device 6. The detection device 16' electrically connects with and detects an external certificate 7 by means of a transmission interface with lines. For example, the detection module 16' adopts a universal serial bus interface (USB Interface), and the certificate 7 can be a universal serial bus advanced encryption standard certificate (USB AES), fingerprint information, etc. However, the aforesaid is only a preferred embodiment of the present invention, but is not limited thereto.

Figure 9:
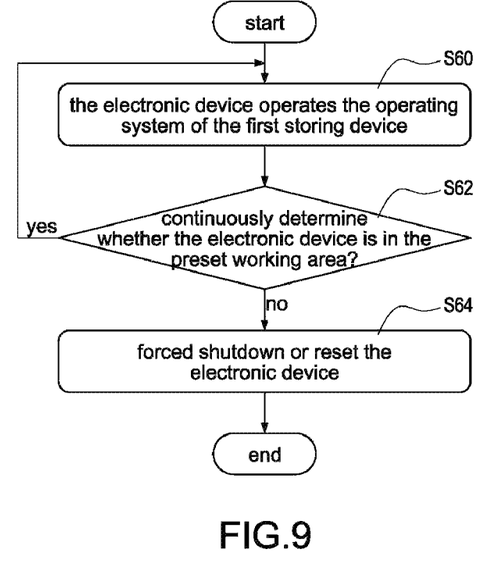
FIG. 9 illustrates a protection flow chart of a fourth embodiment of the present invention.

Please refer to FIG. 9, which illustrates a protection flow chart of the fourth embodiment of the present invention. For the present invention, the electronic devices 1, 1', 4, and 6 are preset in the state of turn-off. When the start buttons of the electronic devices 1, 1', 4, and 6 are triggered, and the positions of the electronic devices 1, 1', 4, and 6 are determined, the operating system 131 of the first storing device 13 or the operating system 141 of the second storing device 14 will be decided to execute the boot process. If the first storing device 13 is set to correspond to the preset working area 2, and when the electronic device 1, 1', 4, or 6 being in the preset working area 2 is determined, the electronic devices 1, 1', 4, or 6 will execute the boot process via the first storing device 13, and operate the operating system 131 of the first storing device 13, as shown in (S60).

To further protect the information in the first storing device 13, the electronic device 1, 1', 4, or 6 can be continuously positioned via the positioning module 11 while in operation, and the micro processing unit 12 continuously determines whether a position of one of the electronic device 1, 1', 4, or 6 is still in the preset working area 2, as shown in (S62). When the electronic device 1, 1', 4, or 6 is not in the preset working area 2 while in operation, the micro processing unit 12 proceeds forced shutdown, or resets on the electronic device 1, 1', 4, or 6, as shown in (S64), therefore, the information in the first storing device 13 will not be brought out of the preset working area 2.

There is one thing to be noted. In (S64), when the electronic device 1, 1', 4, or 6 is not in the preset working area 2, the electronic device 1, 1', 4, or 6 is turned off first. Therefore, when the electronic device 1 is re-started, a current position is re-determined and the operating system 141 of the second storing device 14 is now a role to execute the boot process. For one embodiment, when the electronic device 1, 1', 4, or 6 is not in the preset working area 2, the micro processing unit 12 sends a control command to shut down the power to the first storing device 13 in order to force the electronic device 1, 1', 4, or 6 off. For another embodiment, the micro processing unit 12 sends a reset command to the central processing unit (CPU, not shown in figure) of the electronic device 1, 1', 4, or 6 (for example, a computer). Hence, the central processing unit forces the electronic device 1, 1', 4, or 6 to proceed the re-boot process. For another embodiment, the micro processing unit 12 further sends the above reset command to the operating system 131 of the first storing device 13, thus the operating system 131 executes the shutdown or re-boot process of the electronic device 1, 1', 4, or 6. However, the aforementioned embodiments may not limit the present invention.

What is claimed is:

1. A protection method for an electronic device, the electronic device having a first storing device corresponding to a preset working area and a second storing device on which a second operating system is stored, comprising the steps of:

a) detecting a position of the electronic device, and acquiring a positioning coordinate datum according to a detection result;

b) determining whether the electronic device is in the preset working area according to the positioning coordinate datum;

c) stopping the electronic device from accessing the first storing device when the electronic device is not in the preset working area;

d) allowing the electronic device to access the second storing device and boot the second operating system when the electronic device is not in the preset working area;

e) detecting an external certificate when the electronic device is in the preset working area;

f) if the external certificate is not detected or the certificate does not pass a verification when the electronic device is in the preset working area, executing the boot process through the second storing device and stopping the electronic device from accessing the first storing device; and g) if the certificate is detected and the certificate passed the verification when the electronic device is in the preset working area, allowing the electronic device to access the first storing device and executing the boot process through the first storing device.

2. The protection method for the electronic device according to claim 1, wherein step (d) further comprises the steps of:
   d1) executing a basic input/output system (BIOS) in the electronic device; and
   d2) executing the second operating system of the second storing device.

3. The protection method for the electronic device according to claim 1, wherein in step (g) further comprises the steps of:
   g1) executing a basic input/output system (BIOS) of the electronic device; and
   g2) executing the first operating system of the first storing device.

4. The protection method for the electronic device according to claim 1 further comprising the steps of:
   h) continuously determining whether the electronic device is in the preset working area; and
   i) shutting off or resetting the electronic device when the electronic device is not in the preset working area.

5. The protection method for the electronic device according to claim 4, wherein in step (i) the power of the first storing device is shut off when the electronic device is not in the preset working area.

6. The protection method for the electronic device according to claim 4, wherein in step (i) a reset command is delivered to a central process unit (CPU) in the electronic device in order to make the central process unit reset the electronic device when the electronic device is not in the preset working area.

7. The protection method for the electronic device according to claim 4, wherein in step (i) a reset command is issued to an operating system in the first storing device in order to make the operating system shut down or reset when the electronic device is not in the preset working area.

8. The protection method for the electronic device according to claim 1, wherein a default state of the electronic device is shut down and the protection method further comprises the step of:
   j) executing the steps (a), (b), (c), (d), (e), (f) and (g) when a start button of the electronic device is triggered.

9. The protection method for the electronic device according to claim 1, wherein step (a) is performed prior to booting the electronic device.

10. An electronic device comprising:
    a positioning module, detecting a position of the electronic device and generating a positioning coordinate datum accordingly;
    a first storing device on which a first operating system is stored;
    a second storing device on which a second operating system is stored;
    a micro processing unit, electrically connecting with the positioning module and the first storing device, the positioning module receiving the positioning coordinate datum, and, prior to booting the electronic device, the micro processing unit determining whether the electronic device is in the preset working area according to the positioning coordinate datum; and
    a switching unit, which electrically connects with the micro processing unit, the first storing device and the second storing device, wherein:
        when the micro processing unit determines that the electronic device is not in the preset working area, the micro processing unit controls the switching unit to disable the first storing device and to enable the second storing device, and allows the electronic device to access the second storing device and boot the second operating system; and
        when the micro processing unit determines that the electronic device is in the preset working area, the micro processing unit determines whether an external certificate is detected, wherein if the external certificate is not detected or the certificate does not pass a verification, the micro processing unit executes the boot process through the second storing device and stops the electronic device from accessing the first storing device, and if the certificate is detected and the certificate passes the verification, the micro processing unit allows the electronic device to access to the first storing device and executes the boot process through the first storing device.

11. The electronic device according to claim 10, micro processing unit further controlling the switching unit to disable the second storing device when the micro processing unit determines that the electronic device is in the preset working area.

12. The electronic device according to claim 11, wherein the switching unit switches a signal line of the first storing device to shut down and to switch a signal line of the second storing device to conducting when the micro processing unit determines that the electronic device is not in the preset working area, the switching unit switches the signal line of the first storing device to conducting and to switch the signal line of the second storing device to shut down when the micro processing unit determines that the electronic device is in the preset working area, the certificate is detected and the certificate passed the verification.

13. The electronic device according to claim 11, wherein the switching unit is a serial advanced technology attachment integrated circuit (SATA IC).

14. The electronic device according to claim 11, wherein the first storing device and the second storing device are hard disks and solid state disks (SSD).

15. The electronic device according to claim 11, wherein the positioning module is one of a global positioning system (GPS), a compass II positioning system, a Glonass system, and a location-based service (LBS).

16. The electronic device according to claim 11, wherein the certificate is one of a radio frequency identification card (RFID Card), a near field communication card (NFC Card), a universal serial bus advanced encryption standard certificate (NFC AES Certificate), and a fingerprint data.

* * * * *